United States Patent
Puri et al.

(10) Patent No.: US 9,367,809 B2
(45) Date of Patent: Jun. 14, 2016

(54) CONTEXTUAL GRAPH MATCHING BASED ANOMALY DETECTION

(71) Applicants: Colin A. Puri, San Jose, CA (US); John K. Nguyen, Mesa, AZ (US); Scott W. Kurth, San Francisco, CA (US)

(72) Inventors: Colin A. Puri, San Jose, CA (US); John K. Nguyen, Mesa, AZ (US); Scott W. Kurth, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 302 days.

(21) Appl. No.: 14/173,533

(22) Filed: Feb. 5, 2014

(65) Prior Publication Data

US 2015/0106324 A1    Apr. 16, 2015

Related U.S. Application Data

(60) Provisional application No. 61/889,722, filed on Oct. 11, 2013.

(51) Int. Cl.
| | |
|---|---|
| G06N 5/04 | (2006.01) |
| G06F 11/07 | (2006.01) |
| H04L 12/24 | (2006.01) |
| G06F 21/55 | (2013.01) |
| H04L 29/06 | (2006.01) |

(52) U.S. Cl.
CPC .............. *G06N 5/04* (2013.01); *G06F 11/0706* (2013.01); *G06F 11/0751* (2013.01); *G06F 21/552* (2013.01); *H04L 41/00* (2013.01); *H04L 63/1425* (2013.01)

(58) Field of Classification Search
CPC ...................................................... G06F 21/00
See application file for complete search history.

(56) References Cited

U.S. PATENT DOCUMENTS

| | | |
|---|---|---|
| 7,681,182 B1 | 3/2010 | Mistry et al. |
| 2004/0225919 A1 | 11/2004 | Reissman et al. |
| 2005/0283680 A1 | 12/2005 | Kobayashi et al. |

FOREIGN PATENT DOCUMENTS

GB    2465860    6/2010

OTHER PUBLICATIONS

Cao, Bin, et al., "Measuring Similarity between Graphs Based on the Levenshtein Distance", Applied Mathematics & Information Sciences, 7(1L), pp. 169-175, 2013.
Tian, Yuanyuan, et al., "SAGA: a subgraph matching tool for biligical graphs", Bioinfomatics, 23(2): pp. 232-239, 2007.

(Continued)

*Primary Examiner* — Stanley K Hill
*Assistant Examiner* — Ola Olude Afolabi
(74) *Attorney, Agent, or Firm* — Mannava & Kang, P.C.

(57) ABSTRACT

Contextual graph matching based anomaly detection may include evaluating computer-generated log file data to create a master directed graph that specifies known events and transitions between the known events. The master directed graph may be processed to determine a plurality of decomposed master graph walks. Incoming computer-generated log file data may be evaluated to create an incoming directed graph that specifies unknown events and transitions between the unknown events. The incoming directed graph may be processed to determine a decomposed incoming walk. Overlap, distance difference, and correlation scores may be determined for each walk pair of a plurality of walk pairs including each of the plurality of decomposed master graph walks and the decomposed incoming walk. One of the decomposed master graph walks may be selected based on the overlap score, the difference score, and the correlation score, to detect an anomaly.

20 Claims, 12 Drawing Sheets

(56) References Cited

OTHER PUBLICATIONS

Papadimitriou, Panagiotis, et al., "Web graph similarity for anomaly detection", Journal of Internet Services and Applications, 1(1); pp. 19-30, 2010.

Gartner, Thomas, et al., "A Short Tour of Kernel Methods for Graphs", Technical report, 2006.

Eberle, William, et al., "Anomaly detection in data represented as graphs", Intelligent Data Analysis, 11: pp. 663-689, 2007.

Dijkman, Remco, et al., Graph Matching Algorithms for Business Process Model Similarity Search, Business Process Management, (5701, pp. 48-63, 2009.

IP Australia, "Patent Examination Report No. 1" on Australian Patent Application No. 2014240239, dated Jan. 9, 2015, 4 pages.

Laura Zager, "Graph Similarity and Matching", Massachusetts Institute of Technology, May 19, 2005, 88 pages.

Horst Bunke, et al., "A graph distance metric based on the maximal common subgraph", Pattern Recognition Letters 19 (1998), pp. 255-259, Mar. 1998.

Xin Hu et al., "Large-scale malware indexing using function-call graphs", Proceeding CCS '09 Proceedings of the 16th ACM Conference on Computer and Communications Security, Nov. 9, 2009, pp. 611-620.

Blake Anderson et al., "Graph-based malware detection using dynamic analysis", Journal in Computer Virology, Springer-Verlag, PA, vol. 7, No. 4, Jun. 8, 2011, pp. 247-258.

European Patent Office, "Extended European search report", EP Application No. 14188168.0-1951/2863309, dated May 11, 2015, 10 pages.

Decomposed Master Graph Walks
112

Pseudo-Code
900

Require: Master graph $G$ and an incoming walk $l_j$
Ensure: Best fitted walk with fitness value, scaled fitness, anomaly probability, correlation, and directionality 902 → $\{w_0...w_n\} \leftarrow$ Use Depth-First Search on $G$ to obtain labels
904 → Sort (timsort) $w_i \in \{w_0...w_n\}$ based on probability of occurrence
906 → coeff $\leftarrow$ call getRankCoeff($\{w_i\}$)
908 → for $w_i \in \{w_i\}$ do
910 → Decompose $w_i$ & $l_j$ into their respective edge sets
 ovrlp $\leftarrow$ call getOverlap($w_i, l_j$)
 lgthdiff $\leftarrow$ call getLengthDiff($w_i, l_j$)
912 → corr $\leftarrow$ call getCorrelation($w_i, l_j$)
 if corr = 0 then
 fitness = 0
 else
914 → fitness $\leftarrow ovrlp * (1 - |lgthdiff|)$
 end if
916 → end for
 fitwalk $\leftarrow$ Maximum $w_i$ based on fitness and maximal overlaps
 if size of fitwalk > 1 then
918 → for walk in fitwalk do
 scaledfitness $\leftarrow fitness[l_j] * coeff[walk]$
920 → end for
 fitwalk $\leftarrow$ Maximum walk based on scaled fitness
922 → end if
 prob = (coeff[fitwalk] - coeff[fitwalk-1])*
924 → fitness[fitwalk]+coeff[fitwalk-1]
926 → dir = abs(corr[fitwalk])/corr[fitwalk]
928 → sig= significance(corr)
 return fitwalk, fitness, scaledfitness, prob, corr, dir, sig

FIG. 9

CONTEXTUAL GRAPH MATCHING BASED ANOMALY DETECTION

CROSS-REFERENCE TO RELATED APPLICATION(S)

This application claims the benefit of Provisional Patent Application Ser. No. 61/889,722, filed Oct. 11, 2013, which is expressly incorporated herein by reference.

BACKGROUND

Enterprise environments typically generate log files to record a variety of activities. Sifting through the log file data sources to find errors and anomalies can be a daunting task, for example, due to the extensive volume of such log files. Log content analytics (LCA) is the application of analytics and semantic technologies to consume and analyze heterogeneous computer-generated log files to discover and extract relevant insights in a rationalized and structured form.

BRIEF DESCRIPTION OF DRAWINGS

Features of the present disclosure are illustrated by way of examples shown in the following figures. In the following figures, like numerals indicate like elements, in which:

FIG. 9 illustrates an example of pseudo-code implemented by the contextual graph matching based anomaly detection system, according to an example of the present disclosure;

DETAILED DESCRIPTION

Figure 1A:
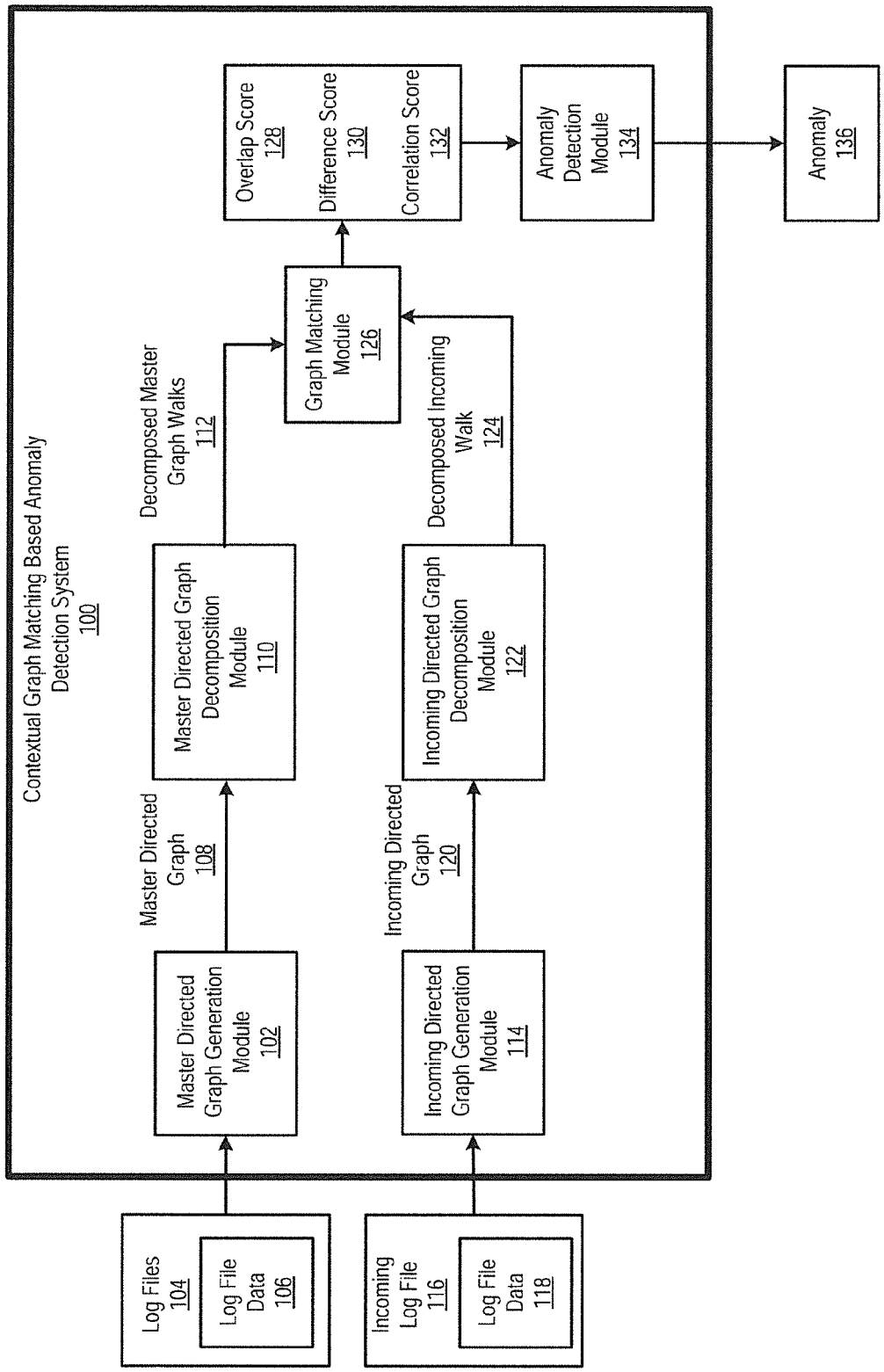
FIG. 1A illustrates a detailed architecture of a contextual graph matching based anomaly detection system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data present in the contents of log files may be characterized by log traces with unique identifiers, time-stamps, events, and actions. These attributes may be indicative of underlying behaviors of applications, the processes that may interact with applications, and the subsequent patterns that exist and may have been created by a series of events. Through mining and correlation, the information contained within log files may be modeled as a graph with statistics, event states, and transition probabilities between events. Learning the behavior of applications through log file traces and understanding the flow of events that occur within applications can facilitate performance of log content analytics, for example, with regard to an enterprise environment.

A contextual graph matching based anomaly detection system and a method for contextual graph matching based anomaly detection are disclosed herein, and may generally provide for discovery of the existence of aberrations and other phenomena within log files as the aberrations and phenomena occur. The system and method disclosed herein may generally provide for extraction of correlations between trace events within log files and the information surrounding them such as probability of occurrence of trace log events, probability of transitions between particular trace log events, execution times of trace log events, and anomalous occurrences of trace log events. The system and method disclosed herein may apply graph matching to log file mining and anomaly detection. The system and method disclosed herein may implement a scalable framework to facilitate learning of application behavior utilizing log files. Based on the mining of large data sets of log files, a master directed graph (i.e., a directed cyclic graph) may be produced. The master directed graph may represent application behaviors through state probabilities, transitions, and other relevant features. The system and method disclosed herein may utilize feature extraction to measure similarity between weighted, labeled, and master directed graphs. The master directed graphs may provide context and intuition on the degree of fitness for a series of related events that a master directed graph generation module of the contextual graph matching based anomaly detection system may mine from log files.

The system and method disclosed herein may characterize how an incoming directed graph representing a set of events differs from a master directed graph that represents known or pre-established events. A graph matching module of the contextual graph matching based anomaly detection system may calculate a bounded metric to characterize the degree of contextual fitness or anomalousness of a decomposed incoming walk compared to a decomposed master graph walk of the master directed graph. The computation of the metric may be based on the master directed graph structure, providing a probabilistic insight on graph similarity. The system and method disclosed herein may provide information that may be used proactively, and may further provide a metric for the contextual anomalousness of an event sequence when compared to the probability distribution of patterns present within an overall mined master directed graph.

According to an example, a contextual graph matching based anomaly detection system is disclosed herein, and may include a processor, and a master directed graph generation module, executed by the processor, to evaluate computer-generated log file data to create, in a computer memory, a master directed graph that specifies known events and transitions between the known events. A master directed graph decomposition module may process the master directed graph to identify a plurality of unique walks through the master directed graph, and to decompose the plurality of unique walks into their probability distributions as a plurality of decomposed master graph walks. An incoming directed graph generation module may evaluate incoming computer-generated log file data to create an incoming directed graph that specifies unknown events and transitions between the unknown events. An incoming directed graph decomposition module may process the incoming directed graph to identify an incoming walk through the incoming directed graph, and to decompose the incoming walk into its probability distribution as a decomposed incoming walk. A graph matching module may determine an overlap score for each walk pair of a plurality of walk pairs including each of the plurality of decomposed master graph walks and the decomposed incoming walk, and further determine a distance difference score and a correlation score for each walk pair of the plurality of walk pairs. An anomaly detection module may select one of the plurality of decomposed master graph walks based on the overlap score, the difference score, and the correlation score, and detect an anomaly based on the selected one of the plurality of decomposed master graph walks.

According to an example, a method for contextual graph matching based anomaly detection is disclosed herein and may include evaluating, by a processor, computer-generated log file data to create, in a computer memory, a master directed graph that specifies known events and transitions between the known events. The method may further include processing the master directed graph to identify a plurality of unique walks through the master directed graph, and to decompose the plurality of unique walks into their probability distributions as a plurality of decomposed master graph walks. The method may include evaluating incoming computer-generated log file data to create an incoming directed graph that specifies unknown events and transitions between the unknown events. The method may further include processing the incoming directed graph to identify an incoming walk through the incoming directed graph, and to decompose the incoming walk into its probability distribution as a decomposed incoming walk. The method may include determining an overlap score for each walk pair of a plurality of walk pairs including each of the plurality of decomposed master graph walks and the decomposed incoming walk by evaluating an intersection and a union of an edge set of one of the plurality of decomposed master graph walks and an edge set of the decomposed incoming walk, and determining a distance difference score and a correlation score for each walk pair of the plurality of walk pairs. The method may further include selecting one of the plurality of decomposed master graph walks based on the overlap score, the difference score, and the correlation score, to detect an anomaly based on the selected one of the plurality of decomposed master graph walks.

According to an example, a non-transitory computer readable medium having stored thereon machine readable instructions for contextual graph matching based anomaly detection is disclosed herein. The machine readable instructions, that when executed, cause a processor to evaluate computer-generated log file data to create, in a computer memory, a master directed graph that specifies frequencies of state transitions within the master directed graph. The machine readable instructions, that when executed, may further cause the processor to process the master directed graph to identify a plurality of unique walks through the master directed graph, and to decompose the plurality of unique walks into their probability distributions as a plurality of decomposed master graph walks. The machine readable instructions, that when executed, may further cause the processor to evaluate incoming computer-generated log file data to create an incoming directed graph that specifies frequencies of state transitions within the incoming directed graph. The machine readable instructions, that when executed, may further cause the processor to process the incoming directed graph to identify an incoming walk through the incoming directed graph, and to decompose the incoming walk into its probability distribution as a decomposed incoming walk. The machine readable instructions, that when executed, may further cause the processor to determine an overlap score for each walk pair of a plurality of walk pairs including each of the plurality of decomposed master graph walks and the decomposed incoming walk, determine a distance difference score for each walk pair of the plurality of walk pairs, and determine a correlation score for each walk pair of the plurality of walk pairs based on the frequencies of state transitions within the master directed graph and the frequencies of state transitions within the incoming directed graph. The machine readable instructions, that when executed, may further cause the processor to select one of the plurality of decomposed master graph walks based on the overlap score, the difference score, and the correlation score, to detect an anomaly based on the selected one of the plurality of decomposed master graph walks.

The system and method disclosed herein may include learning capabilities whereby the known master directed graph generated from the log files may be evolved as more information related to the master directed graph becomes available. The system and method disclosed herein may be applicable in areas, such as, for example, audit or regulatory compliance, security policy compliance, digital forensic investigation, security incidence response, anomaly detection, error tracking, application debugging, fraud, and/or in situations where there is a need for active intelligence as to the operational behavior of applications and events for which guidance on proactive measures are sought. Generally, the system and method disclosed herein may be applicable to any area that requires the understanding of data and application behavior. For example, the log files and related log file data as described herein may be related to a user's interactions with a website, for example, to determine whether the interactions are intended to bypass a security mechanism related to the website. Based on the analysis of the log file data, the system and method disclosed herein may detect anomalies related to the user's interaction with the website (e.g., whether the user's interaction is a typical interaction, or whether the user's interaction is unauthorized).

The system and method disclosed herein may apply trace mining techniques to discover the temporal relationships between log trace events. The system and method disclosed herein may further discover the probability of event occurrences, discover the probability of transitions between events, and detect and report anomalous states by analyzing the execution times of events. Further, the system and method disclosed herein may cluster and group related events based on transition density, and produce visualizations representing temporal rules. The output of the system and method disclosed herein may be fed into other processes for real-time processing or enrichment. The system and method disclosed herein may be used as a plug-in framework that has the capability to change backend connectors as the backend technology changes. Further, the system and method disclosed herein may provide a reusable framework that can be called and reused as needed with no modification to the original source.

The system and method disclosed herein may provide for processing of logs and extraction of trace sequences at large volumes of data. As disclosed herein, the system and method disclosed herein may further provide for performance of extraction with parallel map-reduce processing, production of graph outputs of information that may be used to seed real-time analysis, anomaly detection, and discovery of root-cause analysis. The system and method disclosed herein may include the capability of running locally, on a local Hadoop cluster, or in the cloud with elastic scaling. The system and method disclosed herein may provide for automatic detection of storage capabilities for the processing of relatively large datasets, and filtering of data to provide targeted views of data of relevant interest in the output. The system and method disclosed herein may further include a configurable plug-in architecture for extension with new techniques, and include an extendable and reusable framework.

For the system and method disclosed herein, matching of decomposed master graph walks to a decomposed incoming walk may account for intersection, intersection strength, intersection confidence, and intersection type. With respect to intersection, intersection may be defined as the existence of a mined trace sequence within a larger mined trace sequence graph (i.e., the master directed graph). Intersection strength may be defined as the degree of fit of a mined trace sequence to a probability ranking. Intersection confidence may be defined as the highest correlation between a trace sequence (i.e., the decomposed incoming walk) and existing trace sequences (i.e., the decomposed master graph walks) within the master directed graph. Further, intersection types may include converging or diverging intersection. For converging intersection, a decomposed incoming walk may fit a known decomposed master graph walk with the same directionality. For diverging intersection, a decomposed incoming walk may fit a known decomposed master graph walk with the opposite directionality.

The contextual graph matching based anomaly detection system and the method for contextual graph matching based anomaly detection disclosed herein provide a technical solution to technical problems related, for example, to anomaly detection in log file data. In many instances, anomaly detection in log file data can be a daunting task, for example, due to the extensive volume of such log files. The system and method disclosed herein provide the technical solution of evaluating computer-generated log file data to create, in a computer memory, a master directed graph that specifies known events and transitions between the known events. The master directed graph may be processed to identify a plurality of unique walks through the master directed graph, and to decompose the plurality of unique walks into their probability distributions as a plurality of decomposed master graph walks. Incoming computer-generated log file data may be evaluated to create an incoming directed graph that specifies unknown events and transitions between the unknown events. The incoming directed graph may be processed to identify an incoming walk through the incoming directed graph, and to decompose the incoming walk into its probability distribution as a decomposed incoming walk. An overlap score may be determined for each walk pair of a plurality of walk pairs including each of the plurality of decomposed master graph walks and the decomposed incoming walk, for example, by evaluating an intersection and a union of an edge set of one of the plurality of decomposed master graph walks and an edge set of the decomposed incoming walk. Further, a distance difference score and a correlation score may be determined for each walk pair of the plurality of walk pairs. One of the plurality of decomposed master graph walks may be selected based on the overlap score, the difference score, and the correlation score, to detect an anomaly based on the selected one of the plurality of decomposed master graph walks.

FIG. 1A illustrates a detailed architecture of a contextual graph matching based anomaly detection system 100, according to an example of the present disclosure. The system 100 may include a master directed graph generation module 102 to receive log files 104, and evaluate log file data 106 of the log files 104 to generate a master directed graph 108 (e.g., see FIG. 2) with labels, weights, and start-stop nodes. The nodes may represent events from the log file data 106, and transitions between one event to another may be represented by arrows. The master directed graph 108 may specify known events and transitions between the known events, or alternatively, frequencies of state transitions within the master directed graph 108. An event may be defined as an occurrence of significance in the log file data 106, and a state may be defined as a condition related to an event. A master directed graph decomposition module 110 may process the master directed graph 108 to identify a plurality of unique walks through the master directed graph 108, and decompose the plurality of unique walks into their probability distributions as decomposed master graph walks 112 (e.g., see FIGS. 3A-3E). An incoming directed graph generation module 114 may receive an incoming log file 116, and evaluate log file data 118 of the incoming log file 116 to generate an incoming directed graph 120 that specifies unknown events and transitions between the unknown events, or alternatively, frequencies of state transitions within the incoming directed graph 120. The incoming directed graph generation module 114 may include similar components as the master directed graph generation module 102 to generate the incoming directed graph 120. An incoming directed graph decomposition module 122 may process the incoming directed graph 120 to identify an incoming walk (e.g., see FIG. 4) through the incoming directed graph 120, and decompose the incoming walk 120 into its probability distribution as a decomposed incoming walk 124 (e.g., see FIG. 5). A graph matching module 126 may process each of the plurality of decomposed master graph walks 112 by comparing each of the plurality of decomposed master graph walks 112 to the decomposed incoming walk 124 to determine an overlap score 128, a difference score 130, and a correlation score 132. An anomaly detection module 134 may select one of the decomposed master graph walks 112 based on the overlap score 128, the difference score 130, and the correlation score 132, to detect an anomaly 136 based on the selected one of the decomposed master graph walks 112.

As described herein, the modules and other elements of the contextual graph matching based anomaly detection system 100 may be machine readable instructions stored on a non-transitory computer readable medium. In addition, or alternatively, the modules and other elements of the contextual graph matching based anomaly detection system 100 may be hardware or a combination of machine readable instructions and hardware.

With respect to the master directed graph 108, generally, the log file data 106 such as log content may be characterized by events with unique identifiers, timestamps, and actions. In order for the master directed graph generation module 102 to generate the master directed graph 108, the master directed graph generation module 102 may extract information such as correlations between trace events, probability of occurrence of trace log events, probability of transitions between particular trace log events, execution times of trace log events, and anomalous occurrences of trace log events, from the log file data 106. The master directed graph 108 that is mined from the log files 104 may represent behavioral patterns that describe temporal ordering and potential causality relationships between trace events that occur with a certain measure of probability. In order to compare a sequence of incoming events (i.e., the decomposed incoming walk 124), to a known model of events (i.e., the master directed graph 108), the incoming directed graph decomposition module 122 may generate the decomposed incoming walk 124 and represent the transitions from one event to another as a weighted and normalized probability. When comparing the decomposed incoming walk 124 to the master directed graph 108, the graph matching module 126 may extract several features, such as, for example, probability ranking of occurrence, overlap, distance, and the correlation of the transition weights or probabilities to describe a time correlated series of log traces.

With respect to generation of the master directed graph 108 from the log file data 106, log files may store information in a transactional format from which trace events may be linked, correlated against time, and associated with unique identifiers. Information present in the log files 104 may include location, origination, and other relevant information for some task or trace occurrence that has been logged. Over time, information that is present in the log file 104 may be mined to link events together, discover time correlated groupings of events or behaviors, and tracked according to frequency of occurrence and frequency of occurrence of transitions between events. With respect to mining of the log files 104 and discovery of insights, the master directed graph generation module 102 may ingest and analyze the content of the log files 104, and discover and extract the temporal causality behaviors of traces and events. The mined information may be viewable as the master directed graph 108 for facilitating exploration. The master directed graph generation module 102 may mine and process logs at scale for extraction of relationships (in either full-scale distributed mode or emulation mode), data profiling, filtering, and exploration.

Figure 1B:
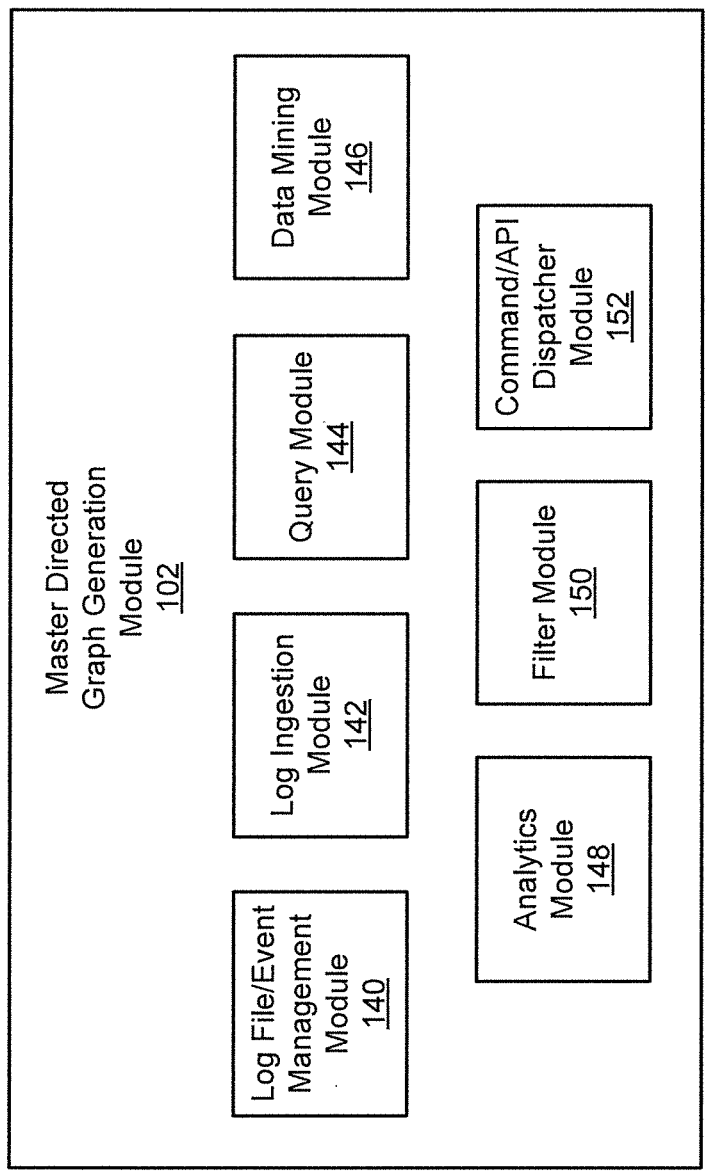
FIG. 1B illustrates a master directed graph generation module of the contextual graph matching based anomaly detection system, according to an example of the present disclosure.

Referring to FIG. 1B, the master directed graph generation module 102 may include a log file/event management module 140 to pull information from the log file data 106. The log file/event management module 140 may control the access and instruction set needed to provide a seamless transition of data between a provider of the log files 104 and the framework of the log file/event management module 140. A log ingestion module 142 may receive and parse the log file data 106. The log ingestion module 142 may also normalize the log file data 106 into a vendor agnostic format for further analysis by the other modules of the master directed graph generation module 102. Normalization of the log file data 106 may be performed via customizable connectors that allow for reuse. Additionally, the log ingestion module 142 may provide the capability to load and store models generated and used by the other modules of the master directed graph generation module 102. A query module 144 may operate as a mediator or interface between the log file/event management module 140 and the log ingestion module 142, and a data mining module 146, an analytics module 148, a filter module 150, and a command and application programming interface (API) dispatcher module 152. The query module 144 may provide an abstraction layer that is different from the underlying providers of the log file data 106 and specific storage formats of the log file data 106. The data mining module 146 may perform the data extraction and discovery of relationships within the log file data 106. The analytics module 148 may perform the analysis of the log file data 106 that has been mined and extracted, for example, using event clustering. The filter module 150 may filter and pair down the log file data 106 to reduce overall size of a model that is exported, for example, by event filtering, edge strength filtering for trace sequence graphs, etc. The command/API dispatcher module 152 may function as the primary interface into log content analytics framework of the master directed graph generation module 102. The command/API dispatcher module 152 may provide for the master directed graph generation module 102 to be operated as a tool from a terminal prompt or utilized within another application as an API with all the configuration and extensibility of a command line application.

The master directed graph generation module 102 may perform data mining in parallel and at scale by creating process flows utilizing, for example, the Hadoop Map-Reduce framework. To provide for process mining in a distributed environment, a plurality of the master directed graph generation modules 102 may be used to read portions of one or more of the log files 104, mine the information locally, and then forward models to a reducer to aggregate information from all of the plurality of master directed graph generation modules 102. The log file data 106 may be normalized according to the schema of the input log files 104, and trace events may be correlated with other known trace events within the master directed graph generation module 102. For a distributed environment, each of the master directed graph generation modules 102 may receive streamed log trace information and deconstruct the information into a rationalized internal form for association with other related trace events according to a feature set including, for example, unique identifiers, time stamps, and trace event categories for the incoming log file data 106. As each trace event is extracted from a log trace, the trace event may be correlated against previously mined and known trace events using its feature set, and ordered temporally to create a unique sequence of trace events. This may be performed for every incoming log trace and subsequent extracted trace events to create multiple trace event sequences. Once the entire set of trace event sequences have been mined from the log files 104, or a portion of the log files 104, a Bayesian network may be constructed from the aggregate view of all trace sequences to generate the master directed graph 108. The master directed graph generation module 102 may track information, such as, for example, probability of event occurrence, time durations, and probability of transitions from one event to another.

Figure 2:
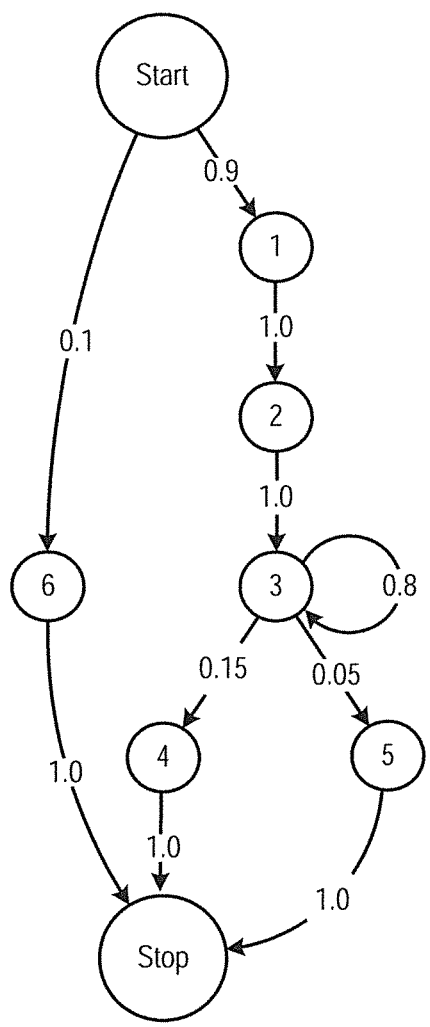
FIG. 2 illustrates a master directed graph with labels, weights, and start-stop nodes, according to an example of the present disclosure.
Figure 3E:
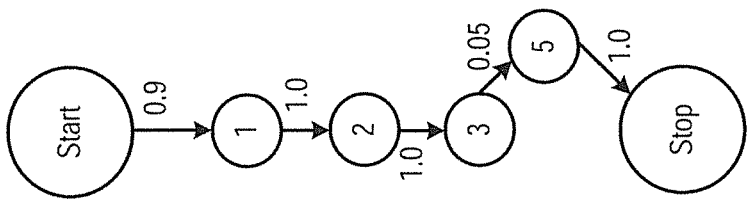
FIGS. 3A-3E illustrate decomposed master graph walks for the master directed graph of FIG. 2, according to an example of the present disclosure.
Figure 3D:
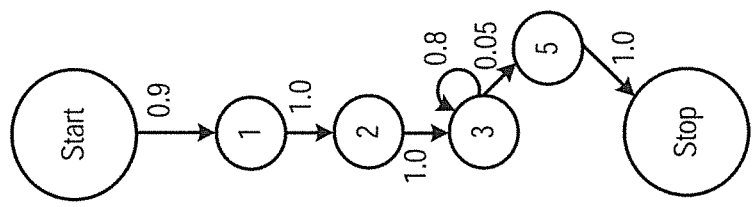
Figure 3C:
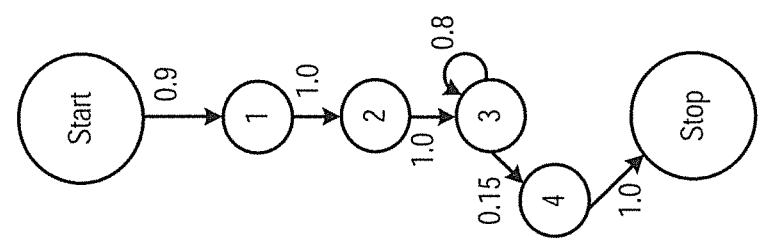
Figure 3B:
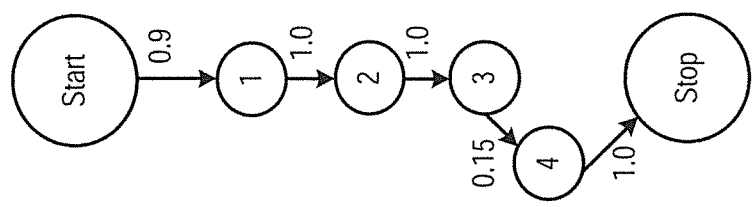
Figure 3A:
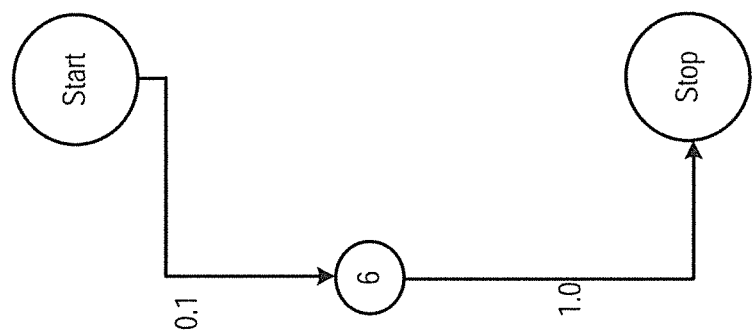

FIG. 2 illustrates a master directed graph 108 with labels, weights, and start-stop nodes, according to an example of the present disclosure. The master directed graph 108 may specify frequencies of state transitions within the master directed graph 108. As shown in FIG. 2, the master directed graph 108 may include start and stop nodes to avoid ambiguity in the structure thereof, for clear definition of the origin and terminal states of a sequence of events, and for proper representation of transition probabilities with respect to the overall mined information. The master directed graph 108 may be designate as G, and include labels, edge weights, start, and stop nodes. For the master directed graph 108, $w_i \epsilon G$ may be defined to be the $i^{th}$ unique walk labeled as an ordered multiset of alternating sequence of nodes, beginning and ending with a start and stop node. The walks may be limited to less than or equal to two occurrences for an event in a path. For the example of the master directed graph 108 of FIG. 2, an example of a walk may include the ordered multiset {Start, 1, 2, 3, 4, Stop}. For the example of FIG. 2, the unique walks through the master directed graph 108 identified by the master directed graph decomposition module 110 are specified in Table 1.

TABLE 1

| Walk | Specification |
|---|---|
| $w_1$ | Start, 6, Stop |
| $w_2$ | Start, 1, 2, 3, 4, Stop |
| $w_3$ | Start, 1, 2, 3, 3, 4, Stop |
| $w_4$ | Start, 1, 2, 3, 3, 5, Stop |
| $w_5$ | Start, 1, 2, 3, 5, Stop |

For the master directed graph 108, a walk may be considered a graph but the opposite may not be true. For the master directed graph 108, the edge occurrence of transition between a given node a and a sequential node b may be denoted as $\lambda_{ab}$ (i.e., the edge probability value). The decomposition of $w_i$ may be defined as the set containing its edge probability values $\Lambda_{wi} = \{\lambda_{ab}, \ldots, \lambda_{mn}\}$ where there may be one or more edges.

Based on the foregoing aspects, assuming independence of the underlying data, the probability ranking for any walk i occurring may be specified as follows:

$$P_{w_i} = \Pi \lambda_{n,k} \quad \text{Equation (1)}$$

For Equation (1), $\lambda_{n,k} \in \Lambda_{w_i}$, and n,k∈$w_i$, where n and k may be adjacent nodes within the master directed graph 108. For the master directed graph 108, the basis for the assumption of independence may derive from a lack of knowledge of the underlying data collection process related to the log file data 106. Equation (1) may be revised to include conditional events as deemed necessary according to specific domain needs. For the example of FIG. 2, the ranked unique walks through the master directed graph 108 identified by the master directed graph decomposition module 110 are specified in Table 2.

TABLE 2

| Rank | Walk | Specification | Percentile |
|---|---|---|---|
| 1 | $w_2$ | Start, 1, 2, 3, 4, Stop | 100 = 1.0 |
| 2 | $w_3$ | Start, 1, 2, 3, 3, 4, Stop | 80 = 0.8 |
| 3 | $w_1$ | Start, 6, Stop | 60 = 0.6 |
| 4 | $w_5$ | Start, 1, 2, 3, 5, Stop | 40 = 0.4 |
| 5 | $w_4$ | Start, 1, 2, 3, 3, 5, Stop | 20 = 0.2 |

For the example of FIG. 2, the unique walks identified by the master directed graph decomposition module 110 may be decomposed into their probability distributions as the decomposed master graph walks 112, as shown in FIGS. 3A-3E.

Since the master directed graph 108 includes labeled events and transitions, the labeled events and transitions may be used to calculate the degree to which a pair of walks has an overlap with the same events and transitions. During computations by the graph matching module 126, utilization of an overlap metric may reduce the overall number of calculations required for performing a match. With a small amount of data or a small master directed graph 108, the reduction in calculations may be negligible. However, when analyzing large amounts of the log file data 106 and a relatively large master directed graph 108, the benefit becomes clear when removing those walks that have zero event and edge overlap. The graph matching module 126 may compute a coverage metric to consider overlapping data points between the decomposed incoming walk 124 and one of the decomposed master graph walks 112. When decomposed into their respective edge sets, correlation of the decomposed incoming walk 124 and one of the decomposed master graph walks 112 may occur on the intersection of edges. Therefore, as described in further detail herein, the graph matching module 126 may consider the degree of correlation coverage (i.e., the correlation score 132), or the Jaccard similarity metric of the comparing sets.

With respect to the overlap score 128 (i.e., a percentage overlap, or $O_{walkpair}$) determined by the graph matching module 126, given a master walk $w_i$ (e.g., one of the decomposed master graph walks 112) and an incoming walk $l_j$ (e.g., the decomposed incoming walk 124), the degree of overlap between and the similarity of walks $w_i$ and $l_j$ may be determined by the Jaccard similarity of the edge sets. The Jaccard similarity of the edge sets may consider overlapping edges and events to produce a metric that represents the degree of coverage or overlap for the correlation. The percentage overlap function to determine the overlap score 128 may be specified as follows:

$$O_{w_i, l_j} = \frac{|\Lambda_{w_i} \cap \Lambda_{l_j}|}{|\Lambda_{w_i} \cap \Lambda_{l_j}|} \quad \text{Equation (2)}$$

For Equation (2), $\Lambda_{l_j}$ may represent the edge set of the decomposed incoming walk 124 being compared, and $\Lambda_{w_i}$ may represent an edge set of one of the decomposed master graph walks 112. Furthermore, |•| may denote the cardinality of a set.

Figure 4:
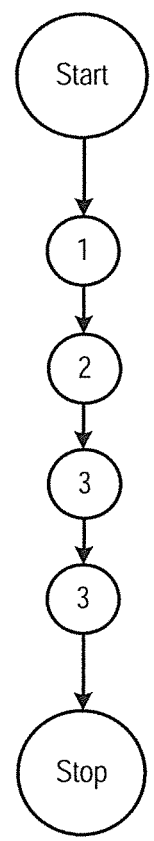
FIG. 4 illustrates an incoming walk, according to an example of the present disclosure.
Figure 5:
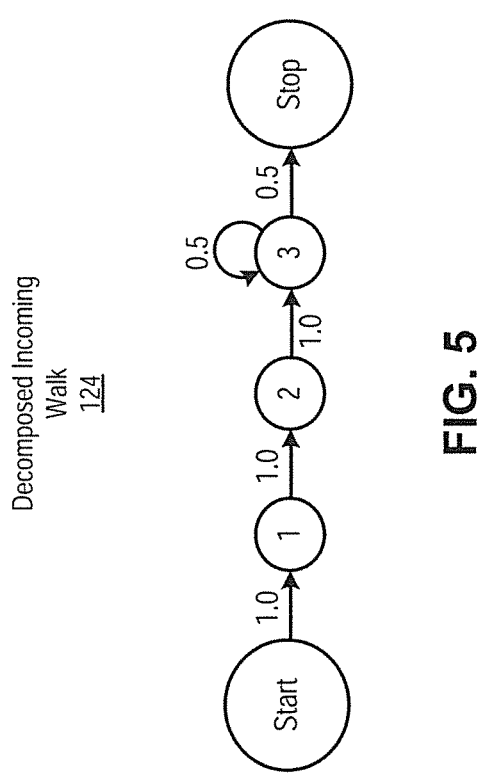
FIG. 5 illustrates a decomposed incoming walk for the incoming walk of FIG. 4 with represented edge weights, according to an example of the present disclosure.

The overlap score 128 may characterize the existence of the same nodes and the same edges between the decomposed incoming walk 124 and one of the decomposed master graph walks 112, but disregard the distance between the respective probability distributions of their edge sets. For example, FIG. 4 illustrates an incoming walk through an incoming directed graph 120 as identified by the incoming directed graph decomposition module 122, and FIG. 5 illustrates the corresponding decomposed incoming walk 124 where the incoming directed graph decomposition module 122 may decompose the incoming walk of FIG. 4 into its probability distribution as the decomposed incoming walk 124 of FIG. 5. For example, walks {1, 2, 3, 4} and {1, 2, 3, 3, 4} with their respective edge sets of {1-2, 2-3, 3-4} and {1-2, 2-3, 3-3, 3-4} may have an overlap score 128 of 0.75. This metric may consider intersection, and the actual values of the corresponding edge transitions may differ. As such, the distance or difference between decomposed walks may be considered as an additional metric. For the example of FIGS. 2-5, the overlap score 128 for each of the pairs formed by the decomposed master graph walks 112 (e.g., see FIGS. 3A-3E) and the decomposed incoming walk 124 (e.g., see FIG. 5) are specified in Table 3.

TABLE 3

| Walk Pair | Overlap |
|---|---|
| $w_1 - i_1$ | 0.0 |
| $w_2 - i_1$ | 0.5 |
| $w_3 - i_1$ | 0.75 |
| $w_4 - i_1$ | 0.75 |
| $w_5 - i_1$ | 0.5 |

With respect to the difference score 130 (i.e., the distance difference, or $L_{walkpair}$), given a master walk (e.g., one of the decomposed master graph walks 112) edge probability set $\Lambda_{w_i}$, and an incoming walk (e.g., the decomposed incoming walk 124) edge probability set $\Lambda_{l_j}$, distance difference for the edge sets for a walk pair may be specified as follows:

$$L_{w_i,l_j} = \frac{\sum |\Lambda_{w_{i,k}} - \Lambda_{l_{j,m}}|}{\sum |\Lambda_{w_{i,k}}| + \sum |\Lambda_{l_{j,m}}|} \quad \text{Equation (3)}$$

The distance difference for the edge sets may produce a bounded metric (i.e., $L_{w_i,l_j}$) representative of how much edge weights differ from one another. For Equation (3), $\Lambda_{w_{i,k}}$ may represent the $k^{th}$ edge weight from a master walk edge set $\Lambda_{w_i}$, $\Lambda_{l_{j,m}}$ may represent the $m^{th}$ edge weight from an incoming walk edge set $\Lambda_{l_j}$, and |•| may denote the cardinality. The $k^{th}$ and $m^{th}$ may correspond to overlapping data points from the walk edge sets. For the example of FIGS. 2-5, the difference score 130 for each of the pairs formed by the decomposed master graph walks 112 (e.g., see FIGS. 3A-3E) and the decomposed incoming walk 124 (e.g., see FIG. 5) are specified in Table 4.

TABLE 4

| Walk Pair | Distance Difference |
|---|---|
| $w_1 - i_1$ | 1.0 |
| $w_2 - i_1$ | 0.19 |
| $w_3 - i_1$ | 0.13 |
| $w_4 - i_1$ | 0.11 |
| $w_5 - i_1$ | 0.17 |

With respect to Equation (2), Equation (2) may disregard the start and stop nodes as these nodes are arbitrarily added. However, Equation (3) includes the beginning and terminal edges as their composition in an incoming walk may affect the weight correlations. These aspects may be relevant when taking into consideration the terminal or last edge in a walk or sequence of events.

With respect to the correlation score 132 (i.e., the correlation coefficient, or r), the correlation score 132 may be based on the Pearson's correlation coefficient. With respect to the correlation score 132, for all $\lambda_{n,k} \in \Lambda_{w_i}$ and $\Lambda_{w_i} \in \Lambda_{l_j}$, the correlation for the decompositions of a walk pair formed by the decomposed incoming walk 124 and one of the decomposed master graph walks 112 may be specified as follows:

$$r_{w_i,l_j} = \begin{cases} 1, & \Lambda_{w_i} \equiv \Lambda_{l_j} \\ p(\Lambda_{w_i}, \Lambda'_{l_j}), & \dfrac{\sum \lambda_{m,h}}{|\Lambda_{l_j}|} = \lambda_{m,h} \\ p(\Lambda'_{w_i}, \Lambda_{l_j}), & \dfrac{\sum \lambda_{n,k}}{|\Lambda_{w_i}|} = \lambda_{n,k} \\ p(\Lambda_{w_i}, \Lambda_{l_j}), & \text{otherwise} \end{cases} \quad \text{Equation (4)}$$

For Equation (4), $\Lambda'_{w_i} = \{\lambda_{Start,Start+1} - o, \ldots, \lambda_{N,K}\}$, $\Lambda'_{l_j} = \{\lambda_{Start,Start+1} - o, \ldots, \lambda_{M,H}\}$, $\lambda_{N,K}$ may represent the last edge from the set $\Lambda_{w_i}$, $\lambda_{M,H}$ may represent the last edge from the set $\Lambda_{l_j}$, o may represent an offset value to compensate for and prevent a division by zero error when using Pearson's correlation, $\Lambda_{m,h}$ may represent the $h^{th}$ edge belonging to an edge set from a master walk, $\lambda_{n,k}$ may represent the $k^{th}$ edge belonging to an edge set from an incoming walk, and |•| may denote the cardinality. Additionally, $$p = \frac{n \sum \lambda_{n,k} \lambda_{m,h} - \sum \lambda_{n,k} \lambda_{m,h}}{\sqrt{[n \sum \lambda_{n,k}^2 - (\sum \lambda_{n,k})^2][n \sum \lambda_{m,h}^2 - (\sum \lambda_{m,h})^2]}} \quad \text{Equation (5)}$$

If two walks have the same set of edge probability values, then the walks have a perfect correlation of 1. However, if one walk has the same edge probability value for every edge, a heuristic may be needed to avoid a potential division by zero. As the addition of the start node is arbitrary, the starting edge probability may be changed by subtracting from it an offset to avoid a division by zero error. Thus, the edge from the start node to the first node may be considered in the walk as a part of the calculation. Otherwise, the Pearsons correlation coefficient may be computed. The weight present for the same edge in the master directed graph 108 may be utilized as its initial weight. Pearsons correlation formula may facilitate discovery of the convergence or divergence of a walk pair. If discovery of convergence and divergence is not needed, then Pearsons correlation may be disregarded entirely, or may be substituted with another correlation methodology for scaling within a percentile rank. For the example of FIGS. 2-5, the correlation score 132 for each of the pairs formed by the decomposed master graph walks 112 (e.g., see FIGS. 3A-3E) and the decomposed incoming walk 124 (e.g., see FIG. 5) are specified in Table 5.

TABLE 5

| Walk Pair | Correlation Coefficient |
|---|---|
| $w_1 - i_1$ | 0 |
| $w_2 - i_1$ | 1 |
| $w_3 - i_1$ | 0.95 |
| $w_4 - i_1$ | 0.95 |
| $w_5 - i_1$ | 1 |

Figure 6:
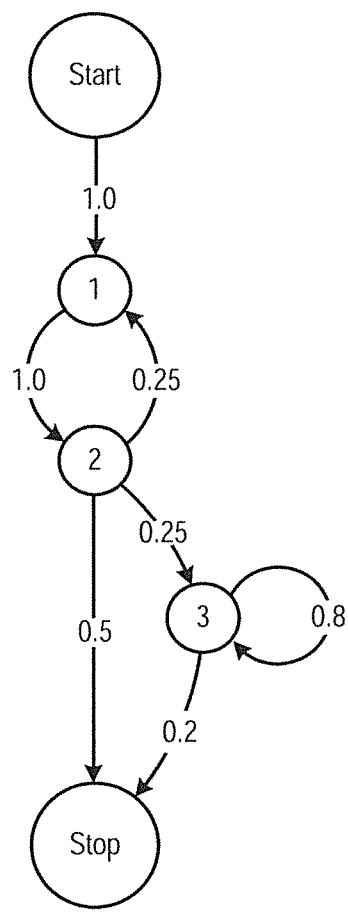
FIG. 6 illustrates a master directed graph with cycles, loops, a prepended start node, and an appended stop node, according to an example of the present disclosure.

Referring to FIG. 6, the master directed graph 108 may include self-loops and cycles. A self-loop may be defined as a node which has an edge going to itself, and a cycle may be defined as a path such that the start and end nodes are the same. For example, the master directed graph 108 of FIG. 6 may include a 2-node cycle that includes nodes 1 and 2. Since nodes 1 and 2 have edges towards each other in both directions, the ordered set represented by $w_i$ cannot be determined. Therefore, an arbitrary start node may be added to avoid this ambiguity.

While self-loops and cycles imply an infinite number of walks, the graph matching module 126 may consider up to the second iteration. This may prevent exponentially smaller probability rankings. Further, the graph matching module 126 may account for existence of the connections between states for the later decomposition of walks into their probability transitions, as opposed to repetition.

The graph matching module 126 may apply a kernel transformation function to Equations (2) and (3) to provide flexibility and refinement depending on the underlying data. The type of transformation chosen may facilitate computation if the master directed graph contains a relatively large number of nodes that may be similar and require additional differentiation. For example, if the underlying distribution of the log file data 106 is Gaussian, a Gaussian kernel transformation may be applied (e.g., see Equation (6) below). An application of the kernel transformations to any of the weights or metrics may provide flexibility.

$$k(x) = \frac{1}{\sigma\sqrt{2\pi}} e^{\frac{-(x-\mu)^2}{2\sigma^2}} \qquad \text{Equation (6)}$$

A triangular transformation may be applied on the distance differences as a means to scale the weights using Equation (7) below such that the more similar or closer two edge sets are to each other, the greater the distance metric and vice versa.

$$k(x)=1-|x| \qquad \text{Equation (7)}$$

Based on Equation (7), an overlap kernel $K_O$ may be represented as $k(x)=|x|$, whereas a difference kernel $K_L$ may be represented by Equation (7). For the example of FIGS. 2-5, the overlap kernel $K_O$ and the difference kernel $K_L$ for each of the pairs formed by the decomposed master graph walks 112 (e.g., see FIGS. 3A-3E) and the decomposed incoming walk 124 (e.g., see FIG. 5) are specified in Table 6.

TABLE 6

| Walk Pair | Overlap | Distance Difference | Overlap Kernel | Difference Kernel |
|---|---|---|---|---|
| $w_1$ - $i_1$ | 0.0 | 1.0 | 0.0 | 0.0 |
| $w_2$ - $i_1$ | 0.5 | 0.19 | 0.5 | 0.81 |
| $w_3$ - $i_1$ | 0.75 | 0.13 | 0.75 | 0.87 |
| $w_4$ - $i_1$ | 0.75 | 0.11 | 0.75 | 0.89 |
| $w_5$ - $i_1$ | 0.5 | 0.17 | 0.5 | 0.83 |

With respect to the degree of fitness metric ($f_{w_i,l_j}$), since Equation (2) characterizes the nodes and edge presence contained in comparing walks, and Equation (3) characterizes the similarity of the edge weights of the decomposed incoming walk 124 in comparison to one of the decomposed master graph walks 112, the degree of fitness metric of two walks may be determined by computing the following:

$$f_{w_i,l_j}=O_{w_i,l_j}k(L_{w_i,l_j}) \qquad \text{Equation (8)}$$

For Equation (8), $f_{w_i,l_j}$ may be denoted as the degree of fitness metric, $O_{w_i,l_j}$ may represent the percentage overlap function to determine the overlap score 128, and $L_{w_i,l_j}$ may represent the difference score 130. For $f_{w_i,l_j}$, the higher the degree of fitness metric, the greater the fit of the decomposed incoming walk 124 to one of the decomposed master graph walks 112. For the example of FIGS. 2-5, the degree of fitness metric $f_{w_i,l_j}$ for each of the pairs formed by the decomposed master graph walks 112 (e.g., see FIGS. 3A-3E) and the decomposed incoming walk 124 (e.g., see FIG. 5) are specified in Table 7.

TABLE 7

| Walk Pair | Degree of Fitness |
|---|---|
| $w_1$ - $i_1$ | 0 |
| $w_2$ - $i_1$ | 0.403 |
| $w_3$ - $i_1$ | 0.653 |
| $w_4$ - $i_1$ | 0.661 |
| $w_5$ - $i_1$ | 0.410 |

For two walks that have the same degree of fitness metric, first, the values from the degree of fitness metric set may be scaled to associate them with the appropriate percentile ranks of the comparison master walks. Secondly, the graph matching module 126 may use the maximal set of those scaled values. This results in the graph matching module 126 favoring the more probable path. Execution of these operations may be limited to those incoming and master walk pairs (e.g., pairs of the decomposed incoming walk 124 and each one of the decomposed master graph walks 112) that have maximal percentage overlap.

During the calculation for the probability of occurrence for the decomposed master graph walks 112, the graph matching module 126 may rank the decomposed master graph walks 112 in descending order and assign a uniform distribution of equal probability mass to each rank. However, other distributions of the assigned probability masses, such as, for example, normal or Gaussian, may be utilized for the probability ranking, and modified to suit the need of the underlying data and desired output. To differentiate walk pairs with the same degree of fitness the graph matching module 126 may assign a ranking coefficient $R_{w_i}$ for a walk pair in accordance to the probability density of occurrence of the decomposed master graph walks 112 to produce a scaled fitness metric (i.e., a ranked anomaly metric set) in Equation (9).

$$s_{w_i,l_j}=f_{w_i,l_j}R_{w_i} \qquad \text{Equation (9)}$$

For Equation (9), $f_{w_i,l_j}$ may represent the degree of fitness metric from a master walk, incoming walk pair, and $R_{w_i}$ may represent the ranking coefficient. Equation (9) may be used to identify the pairs formed by the decomposed incoming walk 124 and the decomposed master graph walks 112 with the best fitness. No two decomposed master graph walks 112 may correspond to identical scaled fitness metrics while being in separate probability masses. For the example of FIGS. 2-5, the scaled fitness metric $s_{w_i,l_j}$ for each of the pairs formed by the decomposed master graph walks 112 (e.g., see FIGS. 3A-3E) and the decomposed incoming walk 124 (e.g., see FIG. 5) are specified in Table 8.

TABLE 8

| Walk Pair | Scaled Fitness Metric |
|---|---|
| $w_1$ - $i_1$ | 0.000 |
| $w_2$ - $i_1$ | 0.403 |
| $w_3$ - $i_1$ | 0.521 |
| $w_4$ - $i_1$ | 0.132 |
| $w_5$ - $i_1$ | 0.164 |

A maximal anomaly metric set pairings of highest overlap from the scaled fitness metric $s_{w_i,l_j}$ may be specified in Table 9.

TABLE 9

| Walk Pair | Maximal Anomaly Metric |
|---|---|
| $w_3$ - $i_1$ | 0.521 |
| $w_2$ - $i_1$ | 0.403 |

A maximal walkpair fitness metric (i.e., Max$\{s_{w_i,l_j,1}, \ldots, s_{w_i,l_j,M}\}$) may be identified by finding the maximum walk pair from the maximal anomaly metric specified in Table 9, as 0.521 for the example of FIGS. 2-5.

In order to determine the probability that the decomposed incoming walk 124 is anomalous within the context of a percentile ranking, for an incoming walk $l_j$ and the master walk (e.g., one of the decomposed master graph walks 112) with the highest fitness metric (or scaled fitness metric in case of ties) $w_i$, a scaled identified maximal walkpair fitness metric (i.e., contextual anomalousness or fitness probability) may be determined by scaling within the probability rank mass of the matched master walk using Equation (10) as follows:

$$\Delta=(R_{high}-R_{low})f_{w_i,l_j}|r_{w_i,l_j}|+R_{low} \qquad \text{Equation (10)}$$

For Equation (10), $\Delta$ may represent the scaled identified maximal walkpair fitness metric within the matching master walk ranking. Further, for Equation (10), $R_{high}$ may represent the ranking coefficient of the maximally fitted master walk, $R_{low}$ may represent the coefficient of the next lowest ranking (or zero if there is no lower ranking coefficient), $r_{w_i,l_j}$ may represent the correlation score 132 for a master-incoming walk pair, and |•| may denote the cardinality. For the example of FIGS. 2-5, as discussed in further detail below, the scaled identified maximal walkpair fitness metric Δ within the matching master walk ranking may be 27.96, with a scaled fitness of 72.04 for walk pair $w_3$-$i_1$.

With respect to convergence and divergence, the decomposed incoming walk 124 may converge or diverge from one of the decomposed master graph walks 112. Convergence and divergence may be indicative of high conformance in the case of convergence, or similar structure yet differing edge weights in the case of divergence. For example, while two walks have the same structure, they may differ in their transition weights, which is indicative of a pattern that is masking itself as another existing pattern.

Figure 7A:
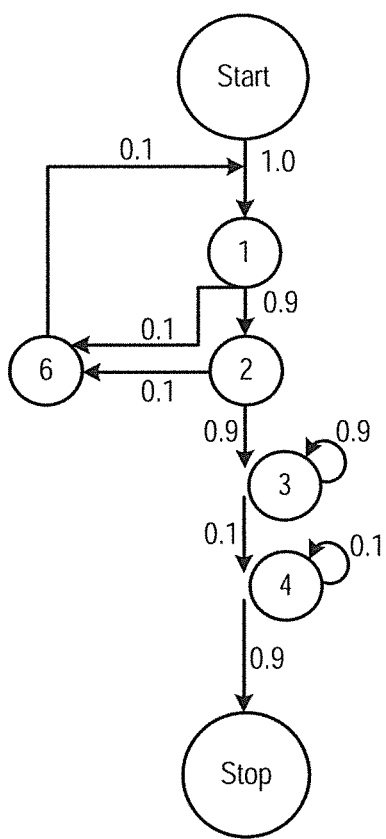
FIGS. 7A and 7B respectively illustrate original and comparison converging walks with equivalent edge weights, according to an example of the present disclosure.
Figure 7B:
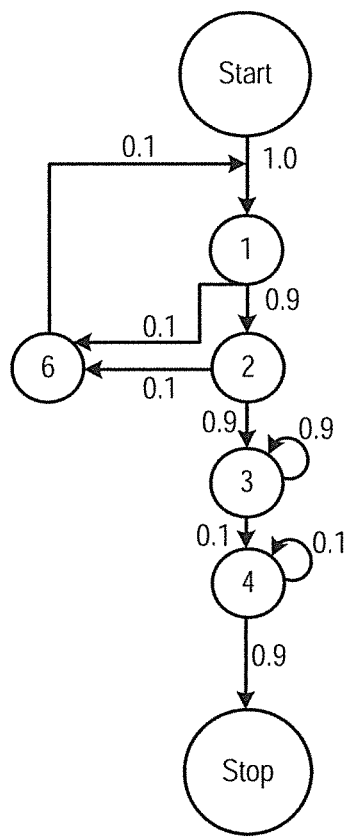
Figure 8A:
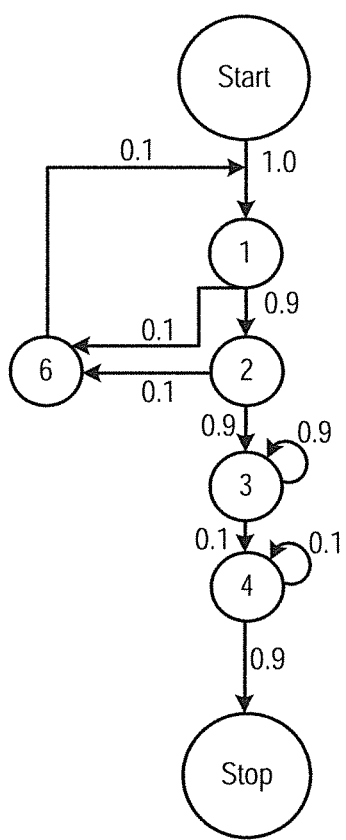
FIGS. 8A and 8B respectively illustrate original and comparison diverging walks with differing edge weights, according to an example of the present disclosure.
Figure 8B:
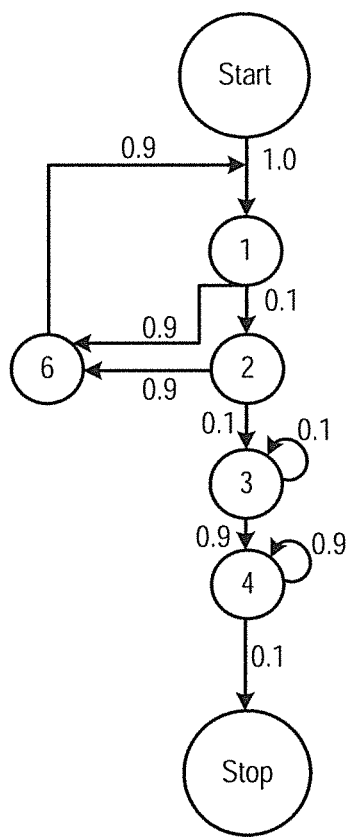

With respect to the computation of Equation (10), the absolute value of the correlation coefficient may be used to prevent the sign of the correlation coefficient from skewing the result of the percentile ranking. However, the sign of the correlation coefficient may be indicative of whether the decomposed incoming walk 124 diverges from or converges to one of the decomposed master graph walks 112. For example, FIGS. 7A and 7B respectively illustrate original and comparison converging walks with equivalent edge weights, according to an example of the present disclosure. FIGS. 8A and 8B respectively illustrate original and comparison diverging walks with differing edge weights, according to an example of the present disclosure. Based on the scalar value or sign, the graph matching module 126 may determine whether a walk pair is converging or diverging by computing its directionality in Equation (11) as follows:

$$d = \frac{|r_{w_i,l_i}|}{r_{w_i,l_i}} \qquad \text{Equation (11)}$$

For Equation (11), $r_{w_i,l_j}$ may represent the correlation score (i.e., the correlation coefficient) for a master-incoming walk pair, and |•| may denote the absolute value. For the example of FIGS. 2-5, the directionality may be 1 for walk pair $w_3$-$i_1$.

With respect to a test for significance, as more and more data points are acquired and more features are compared, the importance of any correlation may grow or dwindle. In general, as the number of points for the log file data 106 increases, the average of the fitness results will converge to an expected value. At smaller sample sizes, shorter walks, and smaller graph feature sets, the fitness results may vary as opposed to larger sample sizes, longer walks, or larger graph feature sets, when performing the graph matching by the graph matching module 126 with the incoming 124 and master walks (e.g., the decomposed master graph walks 112) or graphs (e.g., the master directed graph 108). To compensate for any fluctuations that may occur, a statistical method may be used for determining whether fitness between two feature sets of walk decompositions or graphs is generated by chance alone, thus providing a confidence metric. Based on Pearson's correlation coefficient, statistical significance may be tested for to provide a confidence metric. By constructing a sampling distribution for the correlation value and determining its standard error, a determination may be made as to whether a concluded result is due to chance alone. For the example of FIGS. 2-5, the significance using t-test and raw Pearson's value may be 0.101 for walk pair $w_3$-$i_1$.

With respect to implementation of the contextual graph matching based anomaly detection system 100, the foregoing graph similarity metrics may be used to determine anomalousness of an incoming, potentially incomplete, walk (e.g., the decomposed incoming walk 124) compared against the probability density distribution of all known decomposed master graph walks 112 with respect to the most probable path of walks that reside within a comparison master graph (e.g., the master directed graph 108).

FIG. 9 illustrates an example of pseudo-code 900 implemented by the contextual graph matching based anomaly detection system 100, according to an example of the present disclosure. The input for the pseudo-code of FIG. 9 may be a mined master graph (e.g., the master directed graph 108) and a potentially incomplete incoming walk (e.g., the decomposed incoming walk 124). The pseudo-code of FIG. 9 may not include any assumptions as to whether information that is present for an incoming walk is a complete feature set for that walk or not. The pseudo-code of FIG. 9 may use the decomposition of the edges and the probabilities of an incoming walk. The pseudo-code of FIG. 9 may transform the decomposed incoming walk 124 such that events occur no more than once and edges have weights associated with them according to the probability of transition between the events. According to an example, a normalized distribution for the weights of graph edges may be used. For the pseudo-code of FIG. 9, the weights do not need to exist in order to complete a successful comparison.

As preprocessing, at 902, the pseudo-code of FIG. 9 may first obtain all the walks (e.g., the decomposed master graph walks 112) of the master directed graph 108 (i.e., the set of labels) through a depth-first search methodology. Next, at 904, the pseudo-code of FIG. 9 may compute the probability ranking (i.e., Equation (1)) for each master walk (e.g., the decomposed master graph walks 112), and sort the master walks in ascending order. At 906, each master walk may be assigned into percentiles by associating a ranking coefficient $R_{w_i}$ to each master walk where each ranking has equal probability mass and the distribution is uniform. The number of master walks may determine the distribution of the ranking coefficients. In the case where more than one master walk has the same probability of occurrence, such master walks may reside within the same probability mass and percentile ranking. At 908, a decomposition of the incoming walk and master walks into their respective edge sets may be performed in order to compute the overlap, distance, and correlation coefficient (i.e., Equation (4)). At 910 generally, the percentage overlap (i.e., Equation (2)) and distance difference (i.e., Equation (3)) metrics may be computed with each of the incoming (e.g., the decomposed incoming walk 124) and master walk pairs. The correlation of edge weights may occur on common edges that are present in both walk decompositions. As shown in FIG. 9, data points are not inserted from one walk decomposition into another (giving the inserted data points a value of zero) to preserve the notion that the incoming walk may be a part of a larger walk. Furthermore, inserting data points may skew the results towards divergence. Therefore, Equation (4) is limited to considering those overlapping points within a data set.

At 912, if an incoming walk does not share any edge with a master walk, this results in a correlation of zero with an overlap of zero, with the fitness metric being zero regardless of the distance difference value. Otherwise, at 914, the fitness value (i.e., Equation (8)) for an incoming walk with each of the master walks may be calculated. At 916, the calculations of the fitness value may be limited to those sequences that have the highest overlap, where the operation may be performed on the maximal overlap set of incoming walk and master walk pairs. The master walks with the highest fitness metric may be identified. At 918, if more than one incoming walk and master walk pair have the same fitness value calculation from Equation (8), a scaled fitness value from Equation (9) may be obtained using the probability ranking coefficient for the master walk match as a multiplier. In some situations, the scaled fitness calculation does not adequately differentiate one match from another, and thus occurs if two master walks have the same probability of occurrence and reside within the same ranked probability mass. If such a situation arises, then choosing either match is sufficient as they will calculate out to the same fitness value and have the same degree of anomalousness. At 920, using the master walk with the highest scaled fitness, at 922, the rank of the master walk with the highest scaled fitness may be determined in the overall master walk's percentile distribution by using the best fitting master walk's ranking coefficient and the ranking coefficient of the next lowest rank from Equation (10). At 924, the directionality from Equation (11) may be determined between the master and incoming walk pairing. At 926, the significance may be determined, and the result of the computation may be returned at 928 by the anomaly detection module 134.

According to an example, for the master directed graph 108 of FIG. 2, a determination as to the anomalousness of the decomposed incoming walk 124 of FIG. 5, i.e., {Start, 1, 2, 3, 3, Stop}, is described. Tables 10 and 11 illustrate the result of execution of the contextual graph matching based anomaly detection system 100, which uses Equations 1-11. Specifically, Table 10 illustrates the decomposed master graph walks 112 in descending order according to their respective ranking coefficients along with overlap and kernel transformed distance metrics, and Table 11 illustrates the decomposed master graph walks 112 in descending order according to their respective ranking coefficients along with correlation, fitness, and scaled fitness metrics.

TABLE 10

| Master Walk | $P_{w_j}$ | $R_{w_j}$ | $O_{w_j, l_1}$ | $k(L_{w_j, l_1})$ |
|---|---|---|---|---|
| $w_2$ | 0.135 | 1.0 | 0.50 | 0.81 |
| $w_3$ | 0.108 | 0.8 | 0.75 | 0.87 |
| $w_1$ | 0.100 | 0.6 | 0.00 | 0.00 |
| $w_5$ | 0.045 | 0.4 | 0.50 | 0.82 |
| $w_4$ | 0.036 | 0.2 | 0.75 | 0.88 |

TABLE 11

| Master Walk | $r_{w_j, l_1}$ | $f_{w_j, l_1}$ | $s_{w_j, l_1}$ |
|---|---|---|---|
| $w_2$ | 1.00 | 0.403 | 0.403 |
| $w_3$ | 0.95 | 0.653 | 0.521 |
| $w_1$ | 0.00 | 0.000 | 0.000 |
| $w_5$ | 1.00 | 0.410 | 0.164 |
| $w_4$ | 0.95 | 0.661 | 0.132 |

In order to determine the anomalousness of the decomposed incoming walk 124 of FIG. 5 for the master directed graph 108 of FIG. 2, a depth-first search may be performed on the master directed graph 108 to extract all unique possible master walks (i.e., the decomposed master graph walks 112). As shown in FIGS. 3A-3E, this results in five master walks with $w_1$={Start, 6, Stop}, $w_2$={Start, 1, 2, 3, 4, Stop}, $w_3$={Start, 1, 2, 3, 3, 4, Stop}, $w_4$={Start, 1, 2, 3, 3, 5, Stop}, and $w_5$={Start, 1, 2, 3, 5, Stop}.

For the example of FIGS. 2-5, the scaled fitness value may be calculated using the set of $f_{w_j, l_j}$ values corresponding to those walk pairs which also reside in the maximal overlap set. As a result, the scaled fitness metric favors the higher probability and the master walk with which an incoming walk matches. For the example of FIGS. 2-5, the closest master walk match is {Start, 1, 2, 3, 3, 4, Stop} or $w_3$, due to the scaled fitness metric result being the highest for that corresponding walk pair. For the example of FIGS. 2-5, the fitness within the probability mass ranking for $w_3$ is $\Delta = (0.8-0.6)*0.653*|0.95|+0.6=0.7204$ with a directionality of 1 which implies convergence.

Based on the foregoing, the anomaly detection module 134 may indicate that the decomposed incoming walk 124 of FIG. 5 fits the master walk $w_3$ of {Start, 1, 2, 3, 3, 4, Stop} with 72.04% fitness and, with respect to the overall probability density of the master directed graph 128 of FIG. 2 with respect to the most probable path, has a 27.96% chance of being anomalous (i.e., the anomaly 136 is 27.96%). The anomaly detection module 134 may further indicate that the decomposed incoming walk 124 of FIG. 5 converges with the particular master walk implying that it is following a known or detected pattern.

With respect to a time complexity by which the contextual graph matching based anomaly detection system 100 decomposes the decomposed incoming walk 124 and a master directed graph 108, finds matching segments, and is capable of producing scalable results, the time complexity for these processes may be linear and on the order of O(n). Further, with respect to master directed graphs 108 of increasing size and complexity, and a plurality of the incoming walks 124 evaluated against such master directed graphs 108, the time complexity for these processes for evaluating multiple incoming walks 124 evaluated against such master directed graphs 108 may be on the order of $O(n^2)$.

Figure 10:
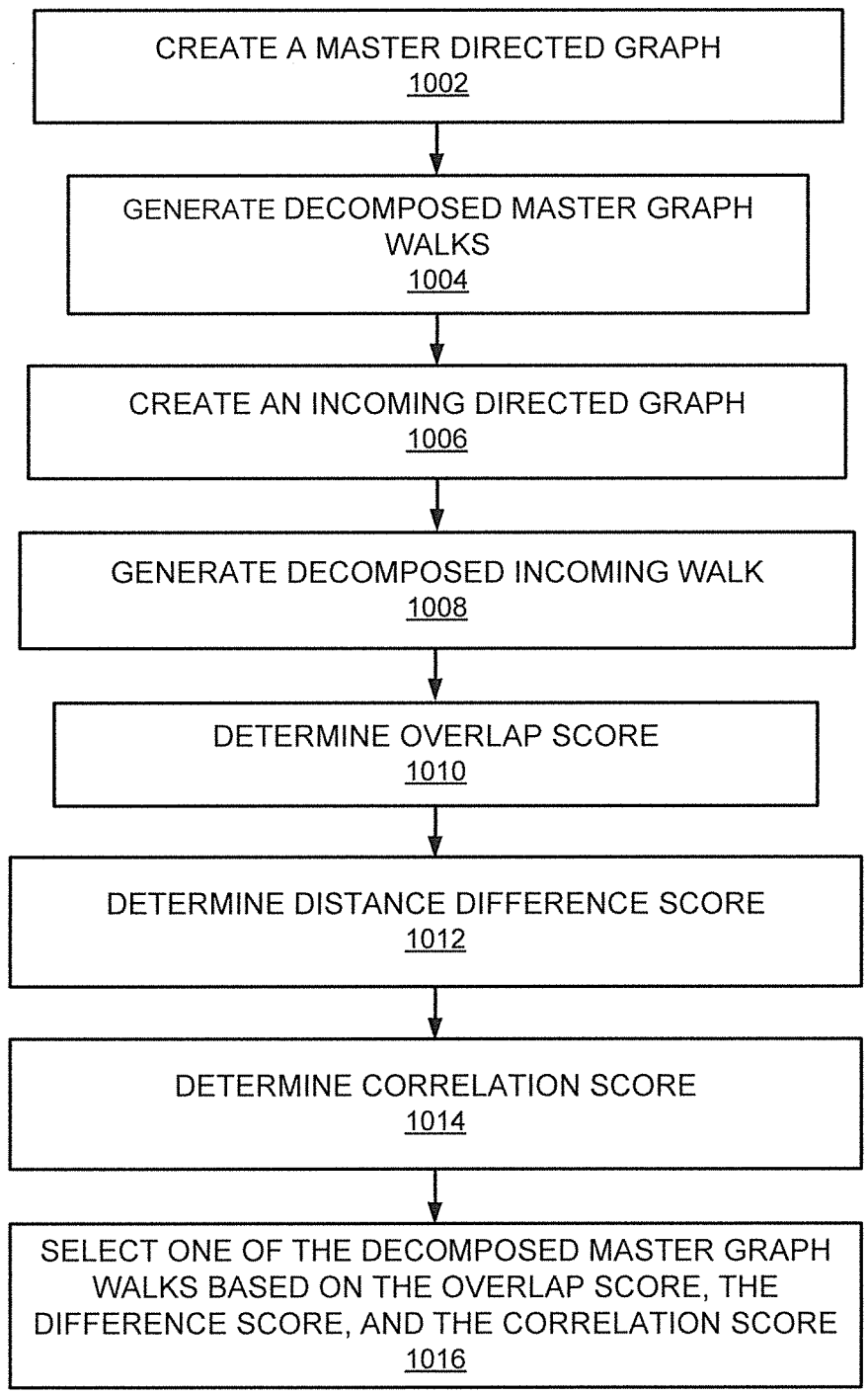
FIG. 10 illustrates a method for contextual graph matching based anomaly detection, according to an example of the present disclosure.

FIG. 10 illustrates a flowchart of a method 1000 for contextual graph matching based anomaly detection, according to an example. The method 1000 may be implemented on the contextual graph matching based anomaly detection system 100 described above with reference to FIGS. 1A-9 by way of example and not limitation. The method 1000 may be practiced in other systems.

Referring to FIGS. 1A and 10, at block 1002, the method 1000 may include evaluating computer-generated log file data 106 to create, in a computer memory, a master directed graph 108 that specifies known events and transitions between the known events.

At block 1004, the method 1000 may include processing the master directed graph 108 to identify a plurality of unique walks through the master directed graph, and to decompose the plurality of unique walks into their probability distributions as a plurality of decomposed master graph walks 112.

At block 1006, the method 1000 may include evaluating incoming computer-generated log file data 118 to create an incoming directed graph 120 that specifies unknown events and transitions between the unknown events.

At block 1008, the method 1000 may include processing the incoming directed graph 120 to identify an incoming walk through the incoming directed graph, and to decompose the incoming walk into its probability distribution as a decomposed incoming walk 124.

At block 1010, the method 1000 may include determining an overlap score (i.e., Equation (2)) for each walk pair of a plurality of walk pairs including each of the plurality of decomposed master graph walks 112 and the decomposed incoming walk 124 by evaluating an intersection and a union of an edge set of one of the plurality of decomposed master graph walks 112 and an edge set of the decomposed incoming walk 124.

At block 1012, the method 1000 may include determining a distance difference score (i.e., Equation (3)) for each walk pair of the plurality of walk pairs, for example, by evaluating an edge weight from an edge set of one of the plurality of decomposed master graph walks 112 and an edge weight from an edge set of the decomposed incoming walk 124.

At block 1014, the method 1000 may include determining a correlation score (i.e., Equation (4)) for each walk pair of the plurality of walk pairs, for example, by evaluating an edge belonging to an edge set of one of the plurality of decomposed master graph walks 112 and an edge belonging to an edge set of the decomposed incoming walk 124.

At block 1016, the method 1000 may include selecting (i.e., by the anomaly detection module 134) one of the plurality of decomposed master graph walks 112 based on the overlap score 128, the difference score 130, and the correlation score 132, to detect an anomaly 136 based on the selected one of the plurality of decomposed master graph walks 112.

According to an example, the method 1000 may include ranking the plurality of unique walks through the master directed graph according to a probability of occurrence (i.e., Equation (1)). The probability of occurrence may be based on an edge set of one of the plurality of decomposed master graph walks 112 and adjacent nodes within the master directed graph 108.

According to an example, the method 1000 may include evaluating a scaled fitness metric (i.e., Equation (9)) related to each walk pair of the plurality of walk pairs for selecting the one of the plurality of decomposed master graph walks 112. The scaled fitness metric may be based on a ranking coefficient $R_{w_i}$ related to the rank of the plurality of unique walks through the master directed graph 108, and a degree of fitness metric $f_{w_i,l_j}$ related to each walk pair of the plurality of walk pairs.

According to an example, the method 1000 may include determining a maximal anomaly metric (e.g., see Table 9) from scaled fitness metrics related to each walk pair of the plurality of walk pairs for selecting the one of the plurality of decomposed master graph walks 112. A scaled fitness metric (i.e., Equation (9)) of the scaled fitness metrics is based on a ranking coefficient $R_{w_i}$ related to the rank of the plurality of unique walks through the master directed graph 108, and a degree of fitness metric $f_{w_i,l_j}$ related to each walk pair of the plurality of walk pairs.

According to an example, the method 1000 may include evaluating a scaled identified maximal walkpair fitness metric (i.e., Equation (10)) for each walk pair of the plurality of walk pairs for selecting the one of the plurality of decomposed master graph walks 112. The scaled identified maximal walkpair fitness metric may be based on a ranking coefficient related to the rank of the plurality of unique walks through the master directed graph 108, a degree of fitness metric $f_{w_i,l_j}$ related to each walk pair of the plurality of walk pairs, and the correlation score (i.e., Equation (4)). The scaled identified maximal walkpair fitness metric may provide a percentage anomalousness of the decomposed incoming walk 124.

According to an example, the method 1000 may include evaluating a kernel transformation function (i.e., Equation (7)) related to each walk pair of the plurality of walk pairs for selecting the one of the plurality of decomposed master graph walks 112.

According to an example, the method 1000 may include evaluating a degree of fitness metric $f_{w_i,l_j}$ for each walk pair of the plurality of walk pairs for selecting the one of the plurality of decomposed master graph walks 112. The degree of fitness metric may be based on the kernel transformation function (i.e., Equation (7)), the overlap score 128, and the distance difference score 130.

According to an example, the method 1000 may include evaluating a directionality (i.e., Equation (11)) for each walk pair of the plurality of walk pairs for selecting the one of the plurality of decomposed master graph walks 112.

Figure 11:
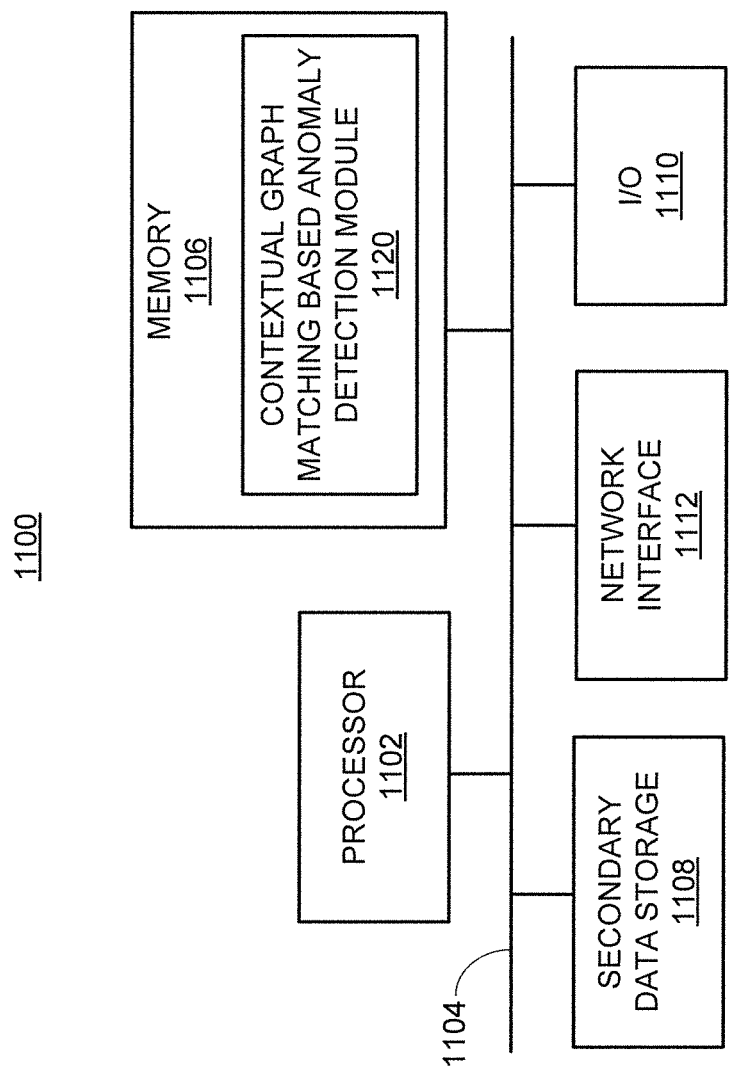
FIG. 11 illustrates a computer system, according to an example of the present disclosure.

FIG. 11 shows a computer system 1100 that may be used with the examples described herein. The computer system may represent a generic platform that includes components that may be in a server or another computer system. The computer system 1100 may be used as a platform for the system 100. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The memory 1106 may include a contextual graph matching based anomaly detection module 1120 including machine readable instructions residing in the memory 1106 during runtime and executed by the processor 1102. The contextual graph matching based anomaly detection module 1120 may include the modules of the system 100 shown in FIG. 1A.

The computer system 1100 may include an I/O device 1110, such as a keyboard, a mouse, a display, etc. The computer system may include a network interface 1112 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A contextual graph matching based anomaly detection system comprising:
   at least one processor;
   a master directed graph generator, executed by the at least one processor, to evaluate computer-generated log file data to create, in a computer memory, a master directed graph that specifies known events and transitions between the known events;
   a master directed graph decomposer, executed by the at least one processor, to process the master directed graph to identify a plurality of unique walks through the master directed graph, and to decompose the plurality of unique walks into their probability distributions as a plurality of decomposed master graph walks;

an incoming directed graph generator, executed by the at least one processor, to evaluate incoming computer-generated log file data to create an incoming directed graph that specifies unknown events and transitions between the unknown events;

an incoming directed graph decomposer, executed by the at least one processor, to process the incoming directed graph to identify an incoming walk through the incoming directed graph, and to decompose the incoming walk into its probability distribution as a decomposed incoming walk;

a graph matcher, executed by the at least one processor, to:
  determine an overlap score for each walk pair of a plurality of walk pairs including each of the plurality of decomposed master graph walks and the decomposed incoming walk,
  determine a distance difference score for each walk pair of the plurality of walk pairs, and
  determine a correlation score for each walk pair of the plurality of walk pairs; and an anomaly detector, executed by the at least one processor, to select one of the plurality of decomposed master graph walks based on the overlap score, the difference score, and the correlation score, and to detect an anomaly based on the selected one of the plurality of decomposed master graph walks.

2. The contextual graph matching based anomaly detection system according to claim 1, wherein the graph matcher is to determine the overlap score by evaluating an intersection and a union of an edge set of one of the plurality of decomposed master graph walks and an edge set of the decomposed incoming walk.

3. The contextual graph matching based anomaly detection system according to claim 1, wherein the graph matcher is to determine the distance difference score by evaluating an edge weight from an edge set of one of the plurality of decomposed master graph walks and an edge weight from an edge set of the decomposed incoming walk.

4. The contextual graph matching based anomaly detection system according to claim 1, wherein the graph matcher is to determine the correlation score by evaluating an edge belonging to an edge set of one of the plurality of decomposed master graph walks and an edge belonging to an edge set of the decomposed incoming walk.

5. The contextual graph matching based anomaly detection system according to claim 1, wherein the master directed graph decomposer is to rank the plurality of unique walks through the master directed graph according to a probability of occurrence, wherein the probability of occurrence is based on an edge set of one of the plurality of decomposed master graph walks and adjacent nodes within the master directed graph.

6. The contextual graph matching based anomaly detection system according to claim 1,
  wherein the master directed graph decomposer is to rank the plurality of unique walks through the master directed graph according to a probability of occurrence, wherein the probability of occurrence is based on an edge set of one of the plurality of decomposed master graph walks and adjacent nodes within the master directed graph, and
  wherein the anomaly detector is to evaluate a scaled fitness metric related to each walk pair of the plurality of walk pairs for selecting the one of the plurality of decomposed master graph walks, wherein the scaled fitness metric is based on a ranking coefficient related to the rank of the plurality of unique walks through the master directed graph, and a degree of fitness metric related to each walk pair of the plurality of walk pairs.

7. The contextual graph matching based anomaly detection system according to claim 1,
  wherein the master directed graph decomposer is to rank the plurality of unique walks through the master directed graph according to a probability of occurrence, wherein the probability of occurrence is based on an edge set of one of the plurality of decomposed master graph walks and adjacent nodes within the master directed graph, and
  wherein the anomaly detector is to determine a maximal anomaly metric from scaled fitness metrics related to each walk pair of the plurality of walk pairs for selecting the one of the plurality of decomposed master graph walks, wherein a scaled fitness metric of the scaled fitness metrics is based on a ranking coefficient related to the rank of the plurality of unique walks through the master directed graph, and a degree of fitness metric related to each walk pair of the plurality of walk pairs.

8. The contextual graph matching based anomaly detection system according to claim 1,
  wherein the master directed graph decomposer is to rank the plurality of unique walks through the master directed graph according to a probability of occurrence, wherein the probability of occurrence is based on an edge set of one of the plurality of decomposed master graph walks and adjacent nodes within the master directed graph, and
  wherein the anomaly detector is to evaluate a scaled identified maximal walkpair fitness metric for each walk pair of the plurality of walk pairs for selecting the one of the plurality of decomposed master graph walks, wherein the scaled identified maximal walkpair fitness metric is based on a ranking coefficient related to the rank of the plurality of unique walks through the master directed graph, a degree of fitness metric related to each walk pair of the plurality of walk pairs, and the correlation score.

9. The contextual graph matching based anomaly detection system according to claim 8, wherein the scaled identified maximal walkpair fitness metric is to provide a percentage anomalousness of the decomposed incoming walk.

10. The contextual graph matching based anomaly detection system according to claim 1, wherein the anomaly detector is to evaluate a kernel transformation function related to each walk pair of the plurality of walk pairs for selecting the one of the plurality of decomposed master graph walks.

11. The contextual graph matching based anomaly detection system according to claim 10, wherein the anomaly detector is to evaluate a degree of fitness metric for each walk pair of the plurality of walk pairs for selecting the one of the plurality of decomposed master graph walks, wherein the degree of fitness metric is based on the kernel transformation function, the overlap score, and the distance difference score.

12. The contextual graph matching based anomaly detection system according to claim 1, wherein the anomaly detector is to evaluate a directionality for each walk pair of the plurality of walk pairs for selecting the one of the plurality of decomposed master graph walks.

13. A method for contextual graph matching based anomaly detection, the method comprising:
  evaluating, by a processor, computer-generated log file data to create, in a computer memory, a master directed graph that specifies known events and transitions between the known events;

processing the master directed graph to identify a plurality of unique walks through the master directed graph, and to decompose the plurality of unique walks into their probability distributions as a plurality of decomposed master graph walks;

evaluating incoming computer-generated log file data to create an incoming directed graph that specifies unknown events and transitions between the unknown events;

processing the incoming directed graph to identify an incoming walk through the incoming directed graph, and to decompose the incoming walk into its probability distribution as a decomposed incoming walk;

determining an overlap score for each walk pair of a plurality of walk pairs including each of the plurality of decomposed master graph walks and the decomposed incoming walk by evaluating an intersection and a union of an edge set of one of the plurality of decomposed master graph walks and an edge set of the decomposed incoming walk;

determining a distance difference score for each walk pair of the plurality of walk pairs;

determining a correlation score for each walk pair of the plurality of walk pairs; and selecting one of the plurality of decomposed master graph walks based on the overlap score, the difference score, and the correlation score, to detect an anomaly based on the selected one of the plurality of decomposed master graph walks.

14. The method of claim 13, wherein determining a distance difference score for each walk pair of the plurality of walk pairs further comprises:

determining the distance difference score by evaluating an edge weight from an edge set of one of the plurality of decomposed master graph walks and an edge weight from an edge set of the decomposed incoming walk.

15. The method of claim 13, wherein determining a correlation score for each walk pair of the plurality of walk pairs further comprises:

determining the correlation score by evaluating an edge belonging to an edge set of one of the plurality of decomposed master graph walks and an edge belonging to an edge set of the decomposed incoming walk.

16. The method of claim 13, further comprising:

ranking the plurality of unique walks through the master directed graph according to a probability of occurrence, wherein the probability of occurrence is based on the edge set of one of the plurality of decomposed master graph walks and adjacent nodes within the master directed graph;

evaluating a scaled identified maximal walkpair fitness metric for each walk pair of the plurality of walk pairs for selecting the one of the plurality of decomposed master graph walks, wherein the scaled identified maximal walkpair fitness metric is based on a ranking coefficient related to the rank of the plurality of unique walks through the master directed graph, a degree of fitness metric related to each walk pair of the plurality of walk pairs, and the correlation score; and providing a percentage anomalousness of the decomposed incoming walk based on the scaled identified maximal walkpair fitness metric.

17. A non-transitory computer readable medium having stored thereon machine readable instructions for contextual graph matching based anomaly detection, the machine readable instructions when executed cause a processor to:

evaluate computer-generated log file data to create, in a computer memory, a master directed graph that specifies frequencies of state transitions within the master directed graph;

process the master directed graph to identify a plurality of unique walks through the master directed graph, and to decompose the plurality of unique walks into their probability distributions as a plurality of decomposed master graph walks;

evaluate incoming computer-generated log file data to create an incoming directed graph that specifies frequencies of state transitions within the incoming directed graph;

process the incoming directed graph to identify an incoming walk through the incoming directed graph, and to decompose the incoming walk into its probability distribution as a decomposed incoming walk;

determine an overlap score for each walk pair of a plurality of walk pairs including each of the plurality of decomposed master graph walks and the decomposed incoming walk;

determine a distance difference score for each walk pair of the plurality of walk pairs;

determine a correlation score for each walk pair of the plurality of walk pairs based on the frequencies of state transitions within the master directed graph and the frequencies of state transitions within the incoming directed graph; and select one of the plurality of decomposed master graph walks based on the overlap score, the difference score, and the correlation score, to detect an anomaly based on the selected one of the plurality of decomposed master graph walks.

18. The non-transitory computer readable medium of claim 17, wherein the machine readable instructions to determine an overlap score for each walk pair of a plurality of walk pairs including each of the plurality of decomposed master graph walks and the decomposed incoming walk further comprise:

determining the overlap score by evaluating an intersection and a union of an edge set of one of the plurality of decomposed master graph walks and an edge set of the decomposed incoming walk.

19. The non-transitory computer readable medium of claim 17, wherein the machine readable instructions to determine a distance difference score for each walk pair of the plurality of walk pairs further comprise:

determining the distance difference score by evaluating an edge weight from an edge set of one of the plurality of decomposed master graph walks and an edge weight from an edge set of the decomposed incoming walk.

20. The non-transitory computer readable medium of claim 17, wherein the machine readable instructions to determine a correlation score for each walk pair of the plurality of walk pairs based on the frequencies of state transitions within the master directed graph and the frequencies of state transitions within the incoming directed graph further comprise:

determining the correlation score by evaluating an edge belonging to an edge set of one of the plurality of decomposed master graph walks and an edge belonging to an edge set of the decomposed incoming walk.

* * * * *